United States Patent Office 3,756,862
Patented Sept. 4, 1973

3,756,862
PROTON ENHANCED DIFFUSION METHODS
Junghi Ahn, San Jose, Calif., and David De Witt, Poughkeepsie, and William S. Johnson and Walter J. Kleinfelder, Hopewell Junction, N.Y., assignors to International Business Machines Corporation, Armonk, N.Y.
Filed Dec. 21, 1971, Ser. No. 210,464
Int. Cl. H01l 7/54
U.S. Cl. 148—1.5
17 Claims

ABSTRACT OF THE DISCLOSURE

Improved semiconductor devices are made by the method of proton enhanced diffusion. A semiconductor wafer having a buried subcollector region, is raised to an elevated temperature and exposed to an accelerated beam of hydrogen or helium ions which may either be focused or be directed through a mask. The beam is rendered incident on the subcollector region. The ions penetrating the subcollector region enhance the diffusion of subcollector type impurities producing a collector pedestal and a collector reach-through for a pedestal transistor. The transistor produced thereby has a uniformly narrow base width having a relatively long minority carrier lifetime and very steep impurity profiles. An improved diffusion capacitor, IGFET, and subsurface diffused interconnection is also made by the method of proton enhanced diffusion.

FIELD OF THE INVENTION

The invention relates to the field of semiconductor devices and fabrication processes therefor.

BACKGROUND DISCUSSION

A brief review of semiconductor physics is here made so that the reader may gain a better perspective as to the state of the art of semiconductor doping and the significance of our invention in light thereof.

Semiconductive materials such as Si, Ge, GaAs, etc., have electrical conductivities ranging between those of metals, and those of insulators. The conductivity may be expressed as $$\sigma = e(n\mu_n + p\mu_p) \qquad \text{Equation 1}$$

where $\sigma$ is the conductivity of ohm$^{-1}$ cm.$^{-1}$
$e$ is the charge of an electron in coulombs
$n$ is the concentration of conduction electrons in cm.$^{-3}$
$p$ is the concentration of holes in cm.$^{-3}$
$\mu_n$ is the mobility of the electrons in cm.$^2$/volt sec., and
$\mu_p$ is the mobility of the holes in cm.$^2$/volt sec.

After raw silicon has been grown into a pure single crystal, the number of conduction electrons, $n$ is equal to the number of holes, $p$ and the material is characterized as an intrinsic semiconductor. However, bipolar transistors, FET transistors, diodes, insulation regions and other useful devices require a semiconductor material wherein the hole concentration $p$ does not equal the conduction electron concentration $n$. An excess of electrons may be produced by adding small amounts of electron donor impurities from Group V of the Periodic Table, typically P, As, or Sb. The increase in the concentration of conduction electrons, $n$ is proportional to the increase in the concentration of the donor impurities, and the semiconductor is designated N-type with a conductivity proportional to $n$ as shown in Equation 1. Similarly, an excess of holes may be produced by adding small amounts of electron accepting impurities from Group III of the Periodic Table, typically B, Ga, or In. The increase in the concentration of holes is proportional to the increase in concentration of the acceptor impurities and the semiconductor is designated P-type with a conductivity proportional to $p$ as shown in Equation 1. Semiconductor devices have regions where both donor and acceptor impurities occur simultaneously and in these regions, donor electrons fill available acceptor levels and it is the difference between the donor and acceptor concentrations which determines whether the crystal is N-type or P-type. Where an N-type and a P-type region intersect, the surface along which the acceptor concentration equals the donor concentration constitutes a p-n rectifying junction.

DISCUSSION OF THE PRIOR ART

Two commercially important processes for depositing donor and acceptor impurities in a semiconductor crystal are high temperature diffusion of the impurity atoms into the crystal, and implantation of the impurity atom in its ionic form by bombardment with a particle accelerator. Both of these methods have disadvantages which are surmounted by the method of our invention.

The diffusion of impurity atoms in a crystalline lattice proceeds from points of higher concentration to points of lower concentration and may be described as in Equation 2 by Fick's Law:

$$J = -D\overline{\nabla} N \qquad \text{Equation 2}$$

where

J is the Flux or number of atoms crossing a unit area in unit time,
D is the diffusivity in cm.$^2$/sec.
and $\overline{\nabla} N$ is the gradient or rate of change of the impurity concentration N per unit distance. The minus sign indicates that the diffusion always occurs away from regions of high concentration. The diffusivity D is a measure of the relative ease with which a substitutional impurity atom will diffuse in the crystal and for high temperature diffusion, can be expressed as $$D = D_0 \exp\{-(H_f + H_m)/KT\} \qquad \text{Equation 3}$$

where $D_0$ is a constant
$H_f$ is the energy necessary to form a vacancy in the crystal lattice
$H_m$ is the energy required for the vacancy to move into an adjacent lattice site
T is the temperature of the crystal in degrees Kelvin and
K is Boltzman's constant.

It is to be noted that conventional diffusion techniques rely on the high temperature of the crystal to supply the energy $H_f$. It is one goal of our invention to provide an alternate method for supplying that energy.

The mechanism of diffusion of an impurity atom which occupies substitutional positions in the crystal lattice, involves its metastable association with a lattice vacancy in what may be called a vacancy-impurity atom pair. The pairs interchange substitutional positions between themselves and nearest neighbor atoms in the lattice, the net effect of which is the diffusion of the impurity atom over a relatively large distance within the crystal. The aggregate motion of all the vacancy-impurity atom pairs is in accordance with Fick's Law, Equation 2. After some finite displacement, the vacancy will be anihilated by an interstitial silicon atom and the impurity atom comes to rest.

In conventional high temperature diffusion processes, the diffusivity, D as expressed in Equation 3, can attain practically useful magnitudes only when the temperature T of the crystal is raised above 1000° centigrade in silicon. It is only at temperatures above this magnitude that a sufficient concentration of vacancies can be induced, in a state of thermodynamic equilibrium, so as to make useful diffusion of impurity atoms to take place over a period of hours. It is this high operating temperature which presents the one important disadvantage of conventional diffusion processes. Bipolar transistors and monolithic circuits require the superposition of well defined regions of N-type and P-type conductivities. Where the process for depositing these regions requires a succession of high temperature diffusion steps, the temperature cycling of each succeeding step reduces the definition and tends to merge the structures formed in the preceeding steps. As a result the P-N junctions so formed are not sufficiently abrupt or precisely located, and the distance separating devices must thus be made oversize, imposing a minimum spacing on the silicon chip.

Another disadvantage of high temperature diffusion is the necessity of employing a relatively large number of diffusion masks in the process of forming the superimposed regions of differing conductivity in bipolar transistors and in monolithic circuits. Each diffusion step requires a new mask corresponding to the differing depths of desired deposition and impurity types, and the substitution of each succeeding mask is attended with some misregistration. The cumulative effect of the mask misregistrations is to misalign structures and to impair the operation and efficiency of the devices produced thereby.

Another disadvantage of high temperature diffusion is the specificity of the impurity type diffused with each step. Since only one impurity type and surface concentration, $c_0$ may be present in the diffusion chamber at any one time, separate diffusion steps must be taken for each distinctly doped region of a device.

In contradistinction to conventional diffusion processes, the implantation of the impurity atom in its ionic form, into the crystals is a non-equilibrium process. The ionized impurity atom is made a projectile which is propelled into the crystal at a known energy and which will lodge within the crystal at a predictable depth. In practice, the process, consists of starting with a silicon wafer having a uniform "background" impurity concentration, e.g. 4 ohm-cm. P-type. Then a bombardment mask is positioned on the wafer and the assembly placed in the irradiation chamber of a particle accelerator. Then N-type impurity atoms, such as phosphorous, are ionized and accelerated to a kinetic energy to form 10 kev. to 2 mev., focused into a beam, and directed onto the surface of the mask. The implantation of the impurity atoms occurs at those areas of the crystal exposed through the mask.

The implanted ions are brought to rest in the crystal through a combination of energy loss mechanisms. At lower energies and in particular for heavier ions, the energy loss is predominately through elastic collisions with the silicon nuclei. For the more energetic and the lighter ions, electronic stopping will be more significant with the energy being transferred to the electrons until the ion is slowed down and then nuclear stopping begins to dominate. The ion, in coming to rest, will also suffer many deflections from its initial path, and the deposition depth or the projected range $R_p$ will be somewhat shorter than the path R it actually follows, as illustrated in FIG. 1. For a given ion and substrate, a specific range may be anticipated depending on the acceleration energy. The interactions of the ion with the target will give rise to a statistical spread and tends to a Gaussian distribution of stopped ions about the mean projected range, $R_p$. A P-N junction will thus occur on each side of this range, located at the points where the profile of the implanted impurity concentration has fallen to that of the background.

Ion implantation of particles causes a number of the substrate atoms to be displaced and microscopic damage regions to be formed. The number of substrate atoms so displaced increases with increasing atomic mass of the incident particle. These regions can be partially annealed out at about 400° centigrade in the case of silicon. For heavy implantation (greater than $10^{15}$ ions per square centimeter for phosphorous ions) these discrete damaged regions become merged and form a completely amorphous layer. Analysis has shown that annealing temperatures of around 650° centigrade are required for their recovery and this takes place epitaxially from the undamaged silicon below. But many crystalline defects still remain and interrupt the periodicity of the lattice structure, which lowers the conduction electron mobility $\mu_n$ and the hole mobility $\mu_p$. The net effect is to reduce the conductivity $\sigma$ of the silicon, as can be seen from Equation 1. It is, therefore, a principal disadvantage of conventional ion implantation methods, which involve projectiles of atomic mass of 11 or greater, that they impart a higher residual bulk resistivity due to the radiation damage from the relatively heavy impurity ion projectiles colliding with the silicon atoms in the lattice. This radiation damage cannot be completely annealed out of the crystal without destroying some of the definition of the structures already deposited.

The efficient operation of bipolar transistors at high emitter currents depends upon the efficient diffusion of minority carriers across the width of the base and through the base-collector junction. The minority carriers injected into the base exist in a non-equilibrium state wherein they, recombine with the majority carriers if they have not traversed the width of the base after the characteristic majority carrier lifetime. The recombination with majority carriers is catalyzed by the presence of defects in the lattice structure of the crystal in the base region. A principal disadvantage of conventional ion implantation techniques is the production of residual lattice damage in the base and collector regions of devices made thereby, thus reducing the minority carrier lifetime and the efficiency of operation of the device.

The foregoing sets out the state of the prior art for methods of doping semiconductors with charge-carrier generating impurities. There follows a brief review of some prior art devices which have been made by the high temperature diffusion or ion implantation processes.

Conventional diffusion techniques have been employed in the prior art to make many types of devices, among which are pedestal transistors. The state of the prior art of single epitaxy pedestal transistor devices is shown in U.S. Pat. No. 3,312,881 to Yu assigned to the IBM Corporation. FIGS. 4A through 4F of the Yu patent show the use of a heavily doped substrate of collector doping type on which an internal layer is grown epitaxially. The active internal collector region is formed by a collector impurity type diffusion from the surface which penetrates to the collector impurity type substrate. The base and emitter regions are then diffused from the surface. The base diffusion is designed so that in the extrinsic area of the device, it does not reach the substrate but is separated from it by an intrinsic material region. The device works well for many applications. But for applications requiring high current densities, at high frequencies, improvements must be made in the collector-type impurity level and the abruptness of the impurity profile achieved at the base-collector junction. If it is attempted to get high impurity density in the collector by raising the surface concentration of the internal collector diffusion, the base region will contain an even higher collector type impurity density which must be compensated by the base diffusion. In addition, the carrier mobility in heavily compensated semiconductor material is lower than that in lighter compensated material, reducing speed. If it is attempted to get uniform high collector type impurity density in the internal collector diffusion by diffusing for a very long time, the substrate doping will outdiffuse into the internal layer. In addition, the conventionally diffused collector impurity profile is not steep enough to provide a reproducible, narrow base width necessary for high frequency applications.

The state of the art for double epitaxy pedestal transistor devices is disclosed in the copending application Ser. No. 875,013 by DeWitt and assigned to the instant assignee now Pat. No. 3,709,746. Disclosed is a double epitaxial process for forming a pedestal transistor comprising the steps of providing a substrate of a first conductivity type and then forming first and second opposite conductivity type epitaxial layers thereover. During the growth of the epitaxial layers, selected outdiffusions from the epitaxial layers form a buried subcollector and pedestal collector region. Diffused isolation regions and base and emitter regions are formed to complete the device in monolithic form. The devices made by this method exhibit the following characteristics (phosphorous emitter and arsenic collector):

$\beta = 26-90$ at 10 milliamps ($\beta$ is the current gain.)
$F_T = 4.8-5.5$ gHz. at 10 milliamps for a 0.1 mil$\times$1.5 mil emitter strip device, and at a $V^{CB} = +0.5V$. ($F_T$ is the gain band-width product.)
$C_c = 0.54$ Pf for a 1 mil$\times$1.5 mil emitter strip device at $V^{CB} = 0$. ($C_c$ is the base-collector capacitance.)

Subsurface electrical interconnections between devices and/or circuits and a monolithic chip had been made in the prior art by means of conventional ion implantation techniques. Conventionally, impurity blocks are formed within a silicon substrate and are then later interconnected by means of implanting like impurity type atoms in regions between the prior deposited impurity blocks. It has been found, however, that in order to obtain low resistivity conduction paths, high temperature annealing of the residual radiation damage must be performed. The exposure of a partially processed monolithic surface to the temperatures necessary to sufficiently anneal out the radiation damage from the high atomic mass impurity atoms, tends to destroy the definition of the prior deposited structures therein. A method for subsurface electrical interconnection of predeposited impurity blocks should render low resistivity conduction paths without jeopardizing the definition of other predeposited structures in the monolithic chip.

IGFET devices have been made in the prior art by means of ion implantation techniques as evidenced by U.S. Pat. 3,533,158 to Bower. Such processes comprise the steps of depositing source and drain diffusion, growing an oxide insulating layer, contacting the source and drain through the oxide, depositing a gate electrode on the oxide, ion implanting the balance of the source and drain regions about the channel region beneath the gate, and annealing the radiation damage from the lattice. Conventional ion implantation processes have the disadvantage of requiring high acceleration voltages to successfully implant the high mass dopant ions through the oxide. The FET devices produced thereby have the disadvantage of a relatively high residual bulk resistivity in the implanted region which cannot be entirely annealed out without destroying the definition of predeposited structures in the wafer.

OBJECTS OF THE INVENTION

One object of the invention is to deposit impurity atoms in a semiconductor at a relatively low temperature in an improved manner.

Another object of the invention is to deposit impurity atoms in a semiconductor, requiring a fewer number of masking steps than prior known methods.

Still another object of the invention is to deposit impurity atoms in a semiconductor at a relatively low temperature and without imparting a higher bulk resistivity than prior art methods.

A further object of the invention is to deposit impurity atoms in a semiconductor by a diffusion process, which process is non-specific as to the impurity type diffused.

A still further object of the invention is to redistribute impurity atoms in a semiconductor by an ion implantation process, without increasing the residual bulk resistivity or reducing the minority carrier lifetime thereof.

Yet another object of the invention is to fabricate a single epitaxy pedestal transistor having a high collector-type impurity level and a steep impurity profile at the base-collector junction, in an improved manner.

Yet a still further object of the invention is to fabricate a single epitaxy pedestal transistor having a high collector type impurity level and a steep impurity profile at the base-collector junction while retaining a low bulk resistivity and a long base-region minority carrier lifetime.

Still another object of the invention is to fabricate low resistivity subsurface electrical interconnections in a monolithic semiconducting chip without disturbing the definition of other predeposited structures therein.

A further object of the invention is to fabricate IGFET devices having low resistivity source and drain regions.

SUMMARY OF THE INVENTION

The above objects are accomplished by our method of proton-enchanced diffusion which will hereinafter be more fully explained, and which surmounts the prior disadvantages associated with the prior art methods of high temperature thermal diffusion and ion implantation of the dopant atoms. The method of proton enhanced diffusion comprises exposing a semiconductor wafer of a first conductivity type, having at least one predefined region of a second conductivity type, to bombardment with an accelerated beam of hydrogen or helium ions while simultaneously maintaining the wafer at an elevated temperature of between 650° and 950° centigrade so as to induce lattice vacancies within and in the vicinity of the region and thereby to enhance the rate and degree of diffusion of the dopant atoms of the second conductivity type at the locus of generation of the lattice vacancies.

The concentration of lattice vacancies generated by the bombarding ions is sufficient to raise diffusivity D to practical operating levels at the relatively low temperatures of from 650–950° centigrade because the energy $H_F$ of Equation 3, necessary to form a vacancy in the crystal lattice, need no longer be supplied by the thermal energy of the lattice.

The redistribution of the impurity atoms in the wafer occurs without specificity as to the impurity type, thus permitting the simultaneous diffusion of N-type and P-type regions.

The low mass hydrogen or helium ions can do no more damage than to produce vacancy-interstitial point defects which anneal out as they are formed and thus the process does not impart a higher residual bulk resistivity to the wafer nor does it substantially reduce minority carrier lifetime.

A single epitaxy pedestal transistor having a high collector type impurity level and a steep impurity profile at the base-collector junction is made by the proton enhanced diffusion process. The pedestal is formed by placing a bombardment mask with a perforation over the subcollector region and bombarding the wafer with accelerated hydrogen or helium ions while maintaining the wafer at an elevated temperature. Alternately the ion beam may be focused and directed onto the subcollector site of the heated wafer without a mask. Electrical interconnections between devices and/or circuits on a monolithic chip are made within the bulk of the semiconductor by the proton enhanced diffusion process. The interconnection of predeposited, heavily doped impurity blocks by means of heating a masked wafer and controllably adjusting the acceleration voltage for bombarding hydrogen or helium ions, yields subsurface electrical interconnections of an improved type. Alternately the ion beam may be focused and programmed to delineate the subsurface interconnections.

IGFET devices are made by the proton enhanced diffusion process. Predeposited source and drain regions are bombarded by hydrogen or helium ions while heated to an elevated temperature. The source and drain grow out from these regions and terminate in alignment with the gate electrode.

BRIEF DESCRIPTION OF THE PREFERRED EMBODIMENTS

A brief discussion of the theory will assist the reader in understanding the proton enhanced diffusion process.

Figure 1:
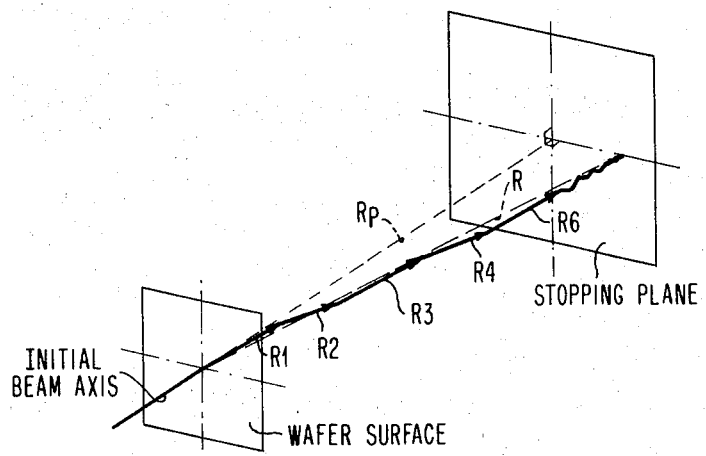
FIG. 1 illustrates the range concepts necessary to an understanding of ion bombardment processes in general.
Figure 2A:
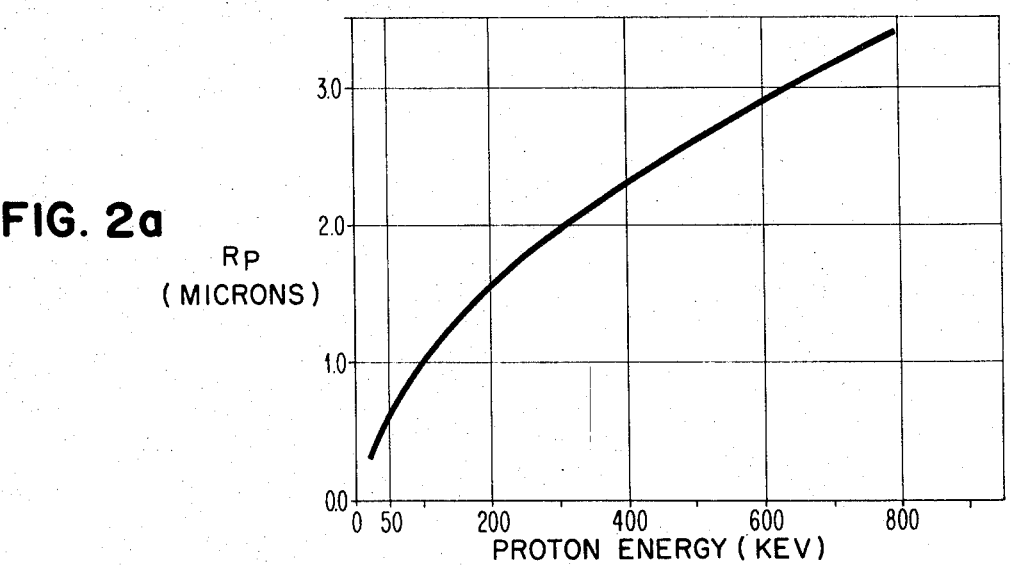
FIGS. 2a–b is a graphical representation of the dependency of the projected range $R_p$ and standard deviation on the kinetic energy of protons in silicon.
Figure 2B:
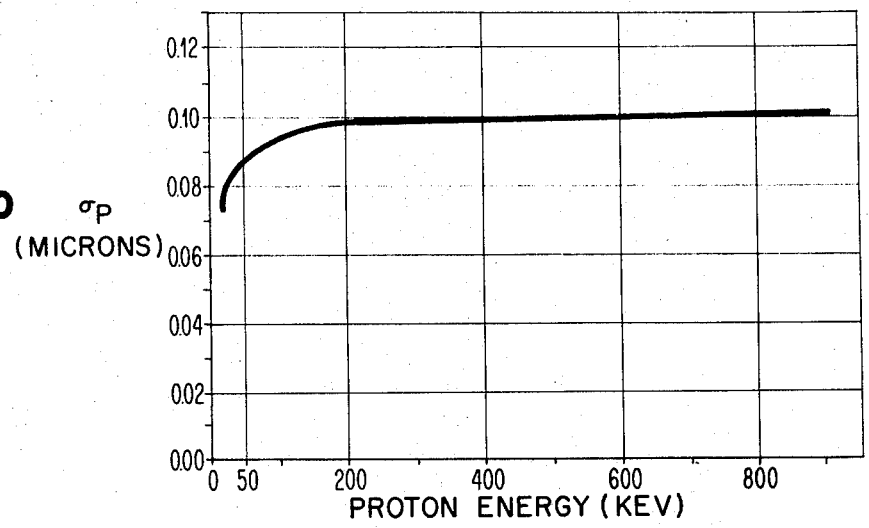

FIG. 2a illustrates the range-energy relationship for protons bombarding silicon and FIG. 2b illustrates the dependency of the standard deviation of the projected range on the proton energy. These values are derived from calculations based on the theory for the stopping of heavy particles at low energy first developed by Niels Bohr in 1948 and further elaborated upon by J. Lindhard et al. in 1963. It will be noted that the standard deviation for the projected range remains constant at approximately 1000 A. over the entire energy range of from 50 kev. to 1 mev. High energy protons and helium ions lose energy by two different collision mechanisms in the process of slowing down and stopping in a crystal of silicon. The first is due to relativistic interactions with the lattice electrons and accounts for most of the energy loss, especially at higher energies. This process however does not cause much angular deflection of the projectile ion from its path, nor does it produce atomic displacements from the silicon lattice. The second mechanism is caused by elastic collisions with the silicon nuclei. This process causes wide angular deflections of the projectile ion and displaces silicon atoms from their equilibrium sites. These elastic collisions, however, are important only at low energies, and therefore occur only at the end of the projectile ion track. The projectile ion is stopped in a short distance by these elastic collisions, causing about 10 displacements producing 10 silicon interstitial-vacancy pairs. It is by the creation of vacancies in this manner that the diffusion of impurity atoms within the crystal is enhanced. Lattice vacancies tend to pair off with substitutional impurities such as arsenic in the silicon lattice, and create diatomic entities having a diffusion length of on the order of 1,000 A. Less work is required to produce a lattice vacancy at a particular site adjacent to an impurity atom than at any other particular lattice site. Thus once a vacancy becomes a nearest neighbor of a particular impurity atom, it will interchange places with the impurity atom and other nearest neighbor atoms to the impurity atom, many times before it again wanders off into the lattice, leaving the impurity atom behind. This repeated interchange between an impurity atom and the lattice vacancy and the surrounding nearest neighbor atoms results in the diffusion of the impurity atom-vacancy pair through the lattice. The hydrogen and helium ions implanted in the crystal do not remain there but diffuse out interstitially at the operating temperatures of the process.

Reference to the more particular application of proton enhanced diffusion processes to the fabrication of pedestal transistor devices, will serve to illustrate some of the advantages of the process.

Figure 3A:
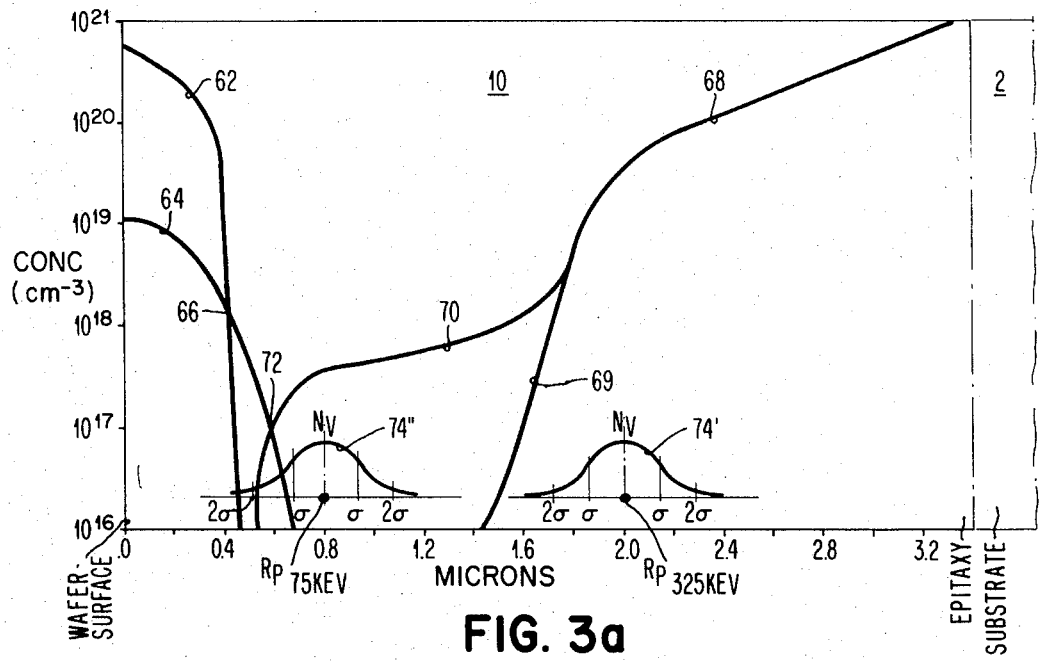
FIGS. 3a–b is a representation of the concentration of impurities along section A–A' for the pedestal transistor depicted.
Figure 3B:
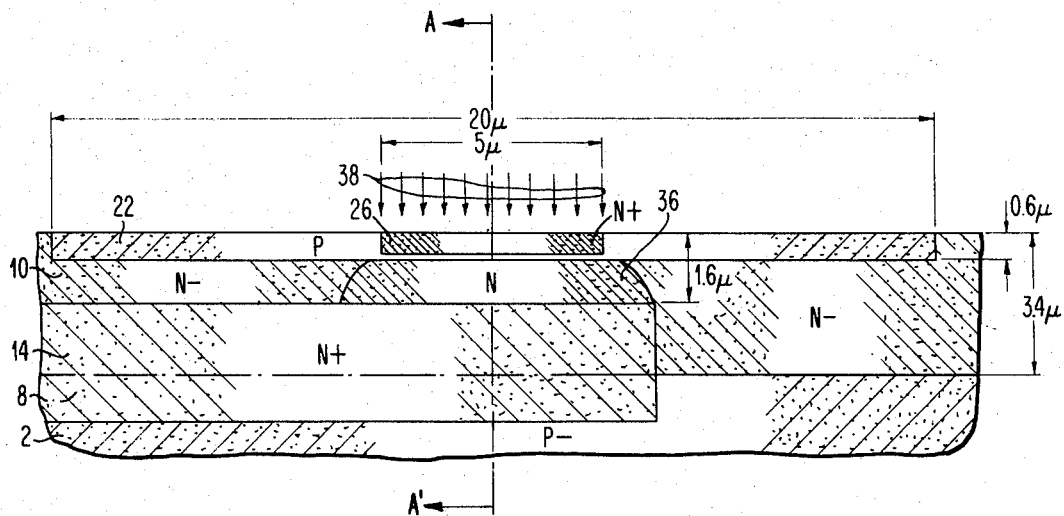
Figure 6:
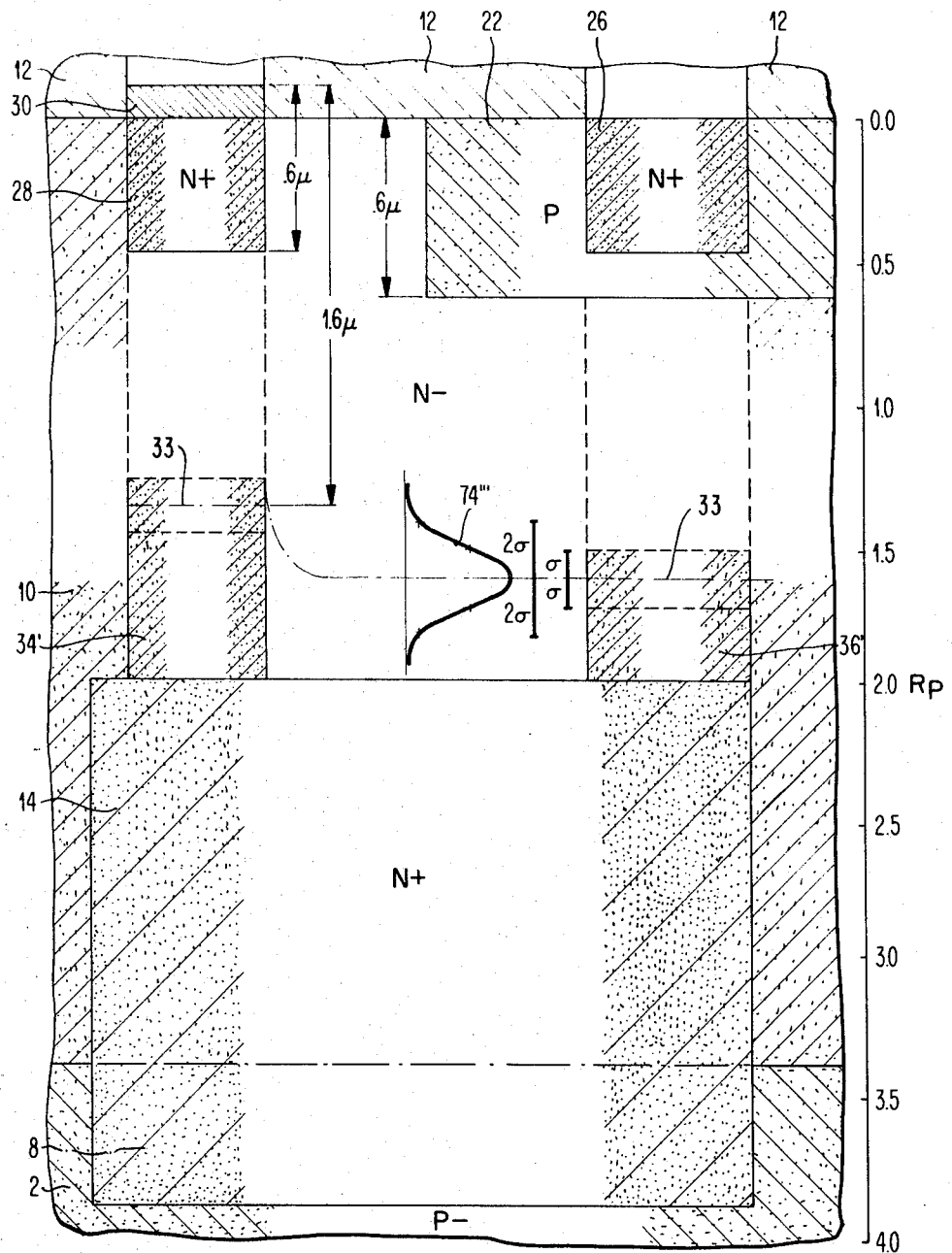
FIG. 6 illustrates the method of inducing differential pedestal heights by selective attenuation in the proton enhanced diffusion process.

FIG. 3a illustrates the impurity concentration profile for a partially completed collector pedestal transistor along the section AA' of FIG. 3b. Viewing FIGS. 3a and 3b together, the substrate 2 is a P–, 10 to 20 ohm centimeter boron doped wafer upon which has been grown an epitaxial layer 10 of the N-type, 4 ohm centimeter, silicon having an impurity concentration of $2 \times 10^{15}$/cc. The subcollector 8, which is diffused into the substrate prior to the growth of the epitaxial layer 10, is an arsenic diffusion having an impurity concentration of $10^{21}$/cc. During the epitaxial growth, the subcollector region 8 is further outdiffused into the epitaxial region to form a new subcollector region 14. Epitaxial layer is grown to a thickness of 3.4 microns and thus the outdiffused subcollector region 14 comes to within 1.6 microns of the external surface of the epitaxial layer 10. A base region 22 comprising a boron diffusion and an emitter region 26 comprising an arsenic diffusion are deposited in the surface of the epitaxial layer 10 such that the distance at which the base's boron impurity concentration is approximately $10^{17}$/cc. is approximately 0.6 micron, the depth desired for the base collector junction. Impurity contour 62 corresponds to the arsenic diffusion for the emitter, and impurity contour 64 corresponding to the boron diffusion for the base of a completed transistor. The intersection 66, of contours 62 and 64 constitutes the emitter-base junction for the transistor. It is seen that for the structure in its present stae, he contour 69 corresponding to the outdiffused region 14 of the subcollector, does not intersect the base contour 64 above the background doping level of $2 \times 10^{15}$/cc. It is here that the application of the method of proton enhanced diffusion will afford a ready means for growing a collector pedestal from the outdiffused region 14 of the subcollector up to the intrinsic region of the base directly beneath the emitter 26. A beam of hydrogen or helium ions can be focused to a cross section of 5 microns and directed onto the emitter site 26 of the transistor structure of FIG. 3b. Or alternately, a beam of hydrogen or helium ions not so narrowly focused, can be rendered incident upon the masking surface of the wafer with a perforation located at the emitter site 26 of FIG. 3b. When a beam of hydrogen ions of energy 325 kev. is directed through the emitter region 26 of the transistor, while the wafer is at a temperature of between 650–950° centigrade, an instantaneous distribution of vacancies is generated at a point 2.0 microns beneath the wafer surface as is indicated by the distribution 74' in FIG. 3a. The lattice vacancies formed in the regions around the 2.0 microns level isotropically diffuse, picking up and carrying with them arsenic impurity atoms from the outdiffused region 14. As the acceleration voltage for the beam of bombarding protons is gradually decreased, the locus of generation 33 of the vacancy-impurity atoms moves up towards the wafer surface as shown in FIG. 6, changing the contour of the impurity concentration profile to that of contour 70 in FIG. 3a. The instantaneous distribution of lattice vacancies may be approximated by a Gaussian distribution 74''' in FIG. 6, having a standard deviation of 1400 A. It is therefore seen that if a base-collector junction having an arsenic impurity concentration of approximately $10^{17}$/cc. is desired at the 0.6 micron level, the position of the center of the lattice vacancy distribution 74'' of FIG. 3a, must be placed at some distance below the 0.6 micron level. It has been found that desirable and reproducible PN junctions may be positioned by making the terminal position of the center of the instantaneous lattice vacancy distribution 74'', 0.2 micron below the desired junction position in FIG. 3a. Thus the acceleration voltage for the bombarding protons is reduced to a value of 75 kev. which causes the terminal value for $R_p$ to be 0.8 micron. At a wafer temperature of between 750 and 850° centigrade and a proton flux of about $6 \times 10^{11}$/cm.$^2$ sec., a linear decrease over a period of two hours, of from 325 kev. to 75 kev. will yield the proton enhanced contour 70 for the collector pedestal 36 of FIG. 3b.

Using a mask to define the beam, the sequence of steps necessary to fabricate the pedestal transistor by the proton enhanced diffusion process are shown in FIGS. 4a through 4f. Starting with a p— substrate 2 of FIG. 4a, it is subjected to a conventional thermal oxidation process in order to form a pair of oxide masking layers 4 and 6. Using photoresist techniques, a subcollector window is opened on the top layer 6 and an N+ subcollector region 8 is diffused therein by employing a suitable material such as arsenic having a $C_0$ concentration of $10^{21}$/cc. A standard oxidizing thermal drive in diffusion process is employed.

Figure 4A:
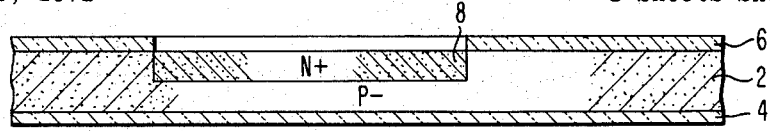
FIGS. 4a–f illustrates the sequence of steps comprising the preferred method for making a pedestal transistor.
Figure 4B:
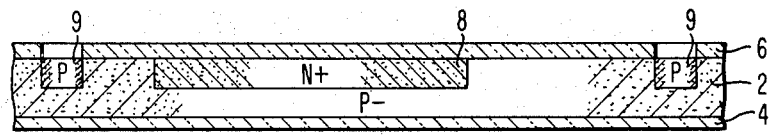

Then as shown in FIG. 4b the oxide layer 6 is regrown during the oxidizing thermal drive in and thus the windows over subcollector 8 is closed. Windows are opened in mask 6 and a P+ subisolation region 9 is diffused therein by employing a suitable material such as boron having a $C_0$ concentration of $10^{21}$/cc.

Figure 4C:
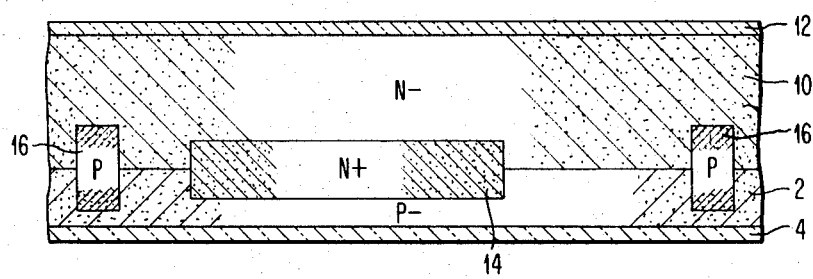

Then as shown in FIG. 4c, an epitaxial layer 10 is grown over the starting P— substrate 2 after the oxide layer 6 has been stripped off, and a new SiO$_2$ layer 12 is grown. During the growth of the epitaxial layer 10, the N+ region 8 is further outdiffused to form a new subcollector region 14 and the P+ region 9 further outdiffuses to form a new P+ region 16. Because boron diffuses faster than arsenic, the P+ regions 16 diffuse further than the N+ subcollector region 14. The epitaxial layer 10 is constituted of an N-type conductivity material having a thickness of 3.4 microns and a resistivity of 4 ohm centimeters. This gives a uniform concentration of approximately $2 \times 10^{15}$/cc. therein.

Figure 4D:
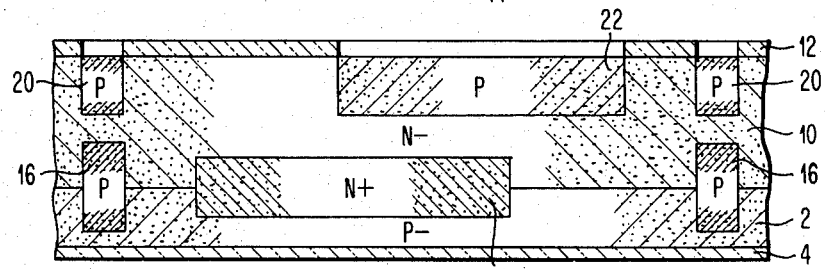

Windows are opened in the oxide layer 12 and P-type isolation region 20 and P type base region 22 are diffused therein by employing oxidizing thermal drive in using suitable material such as boron having a $C_0$ concentration of $10^{19}$/cc., as shown in FIG. 4d. The isolation diffusion segment 20 and the base region diffusion 22 extend down to 0.6 micron from the surface of the epitaxial layer 10 and at that level have an impurity concentration of approximately $10^{17}$/cc. It is noted that a distance of approximately 1 micron separates the outdiffused region 14 of the subcollector from the base region 22 but that the subisolation regions 16 have contacted with the surface isolation region 20. This connection will be even further enhanced during the next diffusion step which forms the emitter.

Figure 4E:
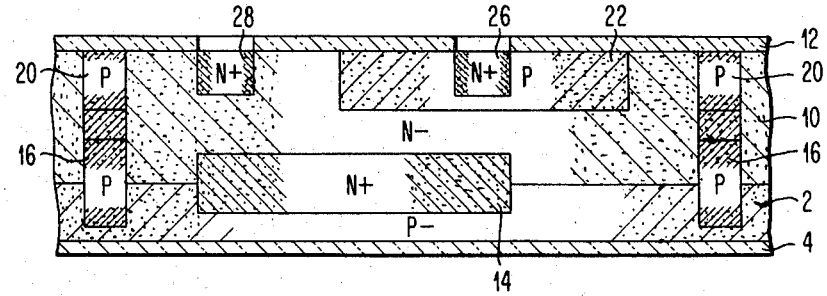

In FIG. 4e the thermal oxide mask 12 is regrown in the exposed window areas by the oxidizing thermal drive in.

Figure 4F:
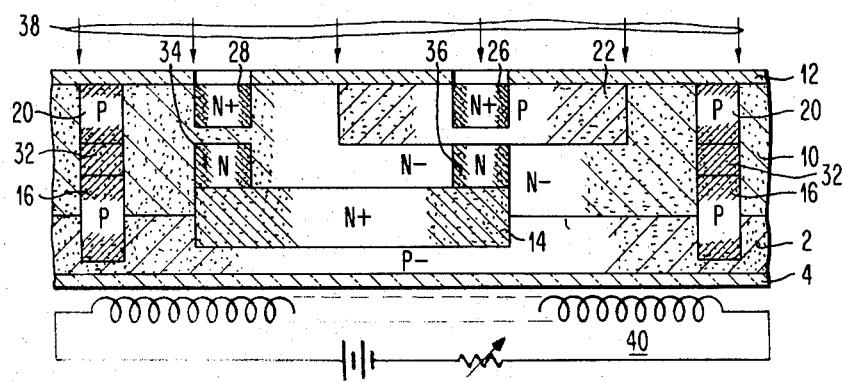
Figure 5:
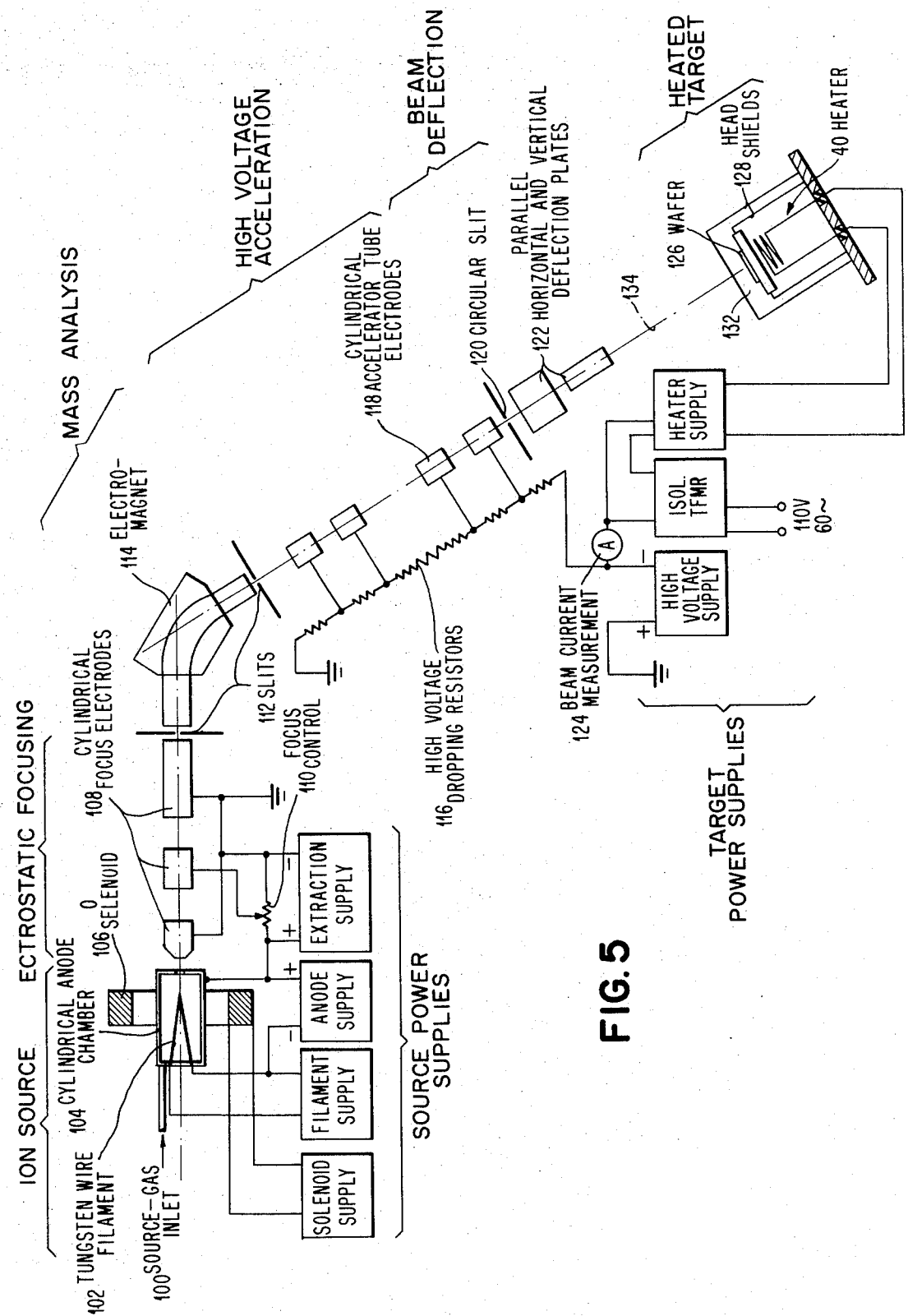
FIG. 5 is a diagram of the apparatus used to bombard wafers in the proton enhanced diffusion process.

Mask 12 will serve as a proton bombardment mask for the proton enhanced diffusion step. Suitable masks for a 325 kev. proton beam can be a two micron thickness of molybdenum or aluminum or a 1.5 micron thickness of gold or silicon dioxide. An SiO$_2$ mask is chosen for its ease of processing and a 1.5 micron thickness applied. Windows are etched in the oxide mask 12 and an N+ emitter region 26 and an N+ subcollector reach-through segment 28 are diffused therein by employing a suitable material such as arsenic having a $C_0$ concentration of $10^{21}$/cc. The subcollector reach-through segment 28 and the emitter region 26 are diffused to a depth such that the distance at which the impurity concentration decreases to a value of approximately $10^{18}$/cc. is 0.45 microns below the surface of the wafer. This will yield a 1500 A. base width in the intrinsic region of the finished transistor. It can be seen that the distance between the $10^{18}$/cc. level of the reach-through segment 28 and top of the outdiffused region 14 of the subcollector is approximately 1500 A. greater than the distance between the desired base-collector junction position and the top of the outdiffused region 14 of the subcollector. Brief reference to FIG. 3a shows that the contour 62 which corresponds to the reach-through segment 28 and the contour 70 which corresponds to the reach-through 34 will meet at the N— background impurity level of $2 \times 10^{15}$/cc. A resistor composed of a 1500 A. thickness of 4 ohm cm. silicon having the $5 \times 20\mu^2$ cross section of reach-through segment 28 has a resistance of approximately 10 ohms. A 10 ohm resistor in the collector circuit does not substantially impair the performance of the transistor. Thus a single proton enhanced diffusion step may be employed to grow both the reach-through 34 and the collector pedestal 36. In FIG. 4f, the wafer is placed within the irradiation chamber 132 of the accelerator system shown in FIG. 5, and wafer heater 40 is activated and the wafer brought up to a temperature of about 800° centigrade. After the temperature across the wafer has stabilized, the beam 134 of the accelerator is turned on and the acceleration voltage set at value of approximately 325 kev. At this acceleration potential, the projected range $R_p$ of the proton beam will be at 2.0 microns below the external surface of the epitaxial layer 10 at the emitter site 26 and the isolation region site 20.

At a proton flux magnitude of $6 \times 10^{11}$/cm.$^2$ sec., the acceleration voltage is decreased at a linear rate, starting at a magnitude of approximately 325 kev. and finishing at a magnitude of approximately 75 kev., over a period of the order of 2 hours. At the end of the period, the impurity concentration for the arsenic atoms which have been grown out of the outdiffused region 14 of the subcollector, reaches a magnitude of approximately $10^{17}$/cc. at a point 0.6 micron below the wafer surface at the base 22 and at the reach-through segment 28. Since the concentration of the boron impurity for the base region equals approximately $10^{17}$/cc. at 0.6 micron below the wafer surface, a P-N junction forms which constitutes the base-collector junction for the pedestal transistor. At the end of the bombardment time, the beam current 134 for the accelerator is turned off and the temperature of the wafer 126 is reduced to room temperature. Then the wafer 126 is removed from the bombardment chamber 132. The SiO$_2$ mask 12 is then regrown and the finished pedestal transistor of FIG. 4f is ready for the application of electrical contacts and a hermetic seal. The device is then finished normally.

The proton enhanced diffusion, process parameters may be adjusted over a wide range depending on the configuration of the devices to be made. For any one application, the product of the flux and the exposure time should remain substantially constant so as to obtain a uniformity of results when varying the flux and exposure. But fluxes may vary from $6 \times 10^{10}$ to $6 \times 10^{13}$ ions/cm.$^2$ sec. and exposure times vary from one minute to 100 hours without exceeding the scope of the invention disclosed.

The criteria which must be met by the species of ionic projectile to be capable of useful employment in proton enhanced diffusion are: (1) the atomic mass must be low enough to avoid imparting a substantial residual bulk resistivity to the bombarded lattice, (2) the covalent radius of the species must be small enough to permit free interstitial passage of the species out of the lattice after bombardment, (3) the state of aggregation of the species must be gaseous at the operating temperature of the process to avoid rupture of the crystal.

Quantitatively, these criteria are implemented as follows: (1) ionic species with an atomic mass of greater than about 10 a.m.u. impart a substantial level of residual damage to the host lattice, when employed as projectile particles. This eliminates all elements except H, He, Li, and Be. (2) When the covalent radius of the projectile species exceeds approximately 1 Å., the freedom of the species to interstitially rediffuse out of the lattice is impaired. Of the above group, only H, He, and Be have a covalent radius of less than 1 A. (3) The species must not condense in the operating temperature range of 650°–950° centigrade. Of the above group, only H and He have boiling temperatures below 650° centigrade.

Thus it is the isotopes of hydrogen and helium which are the preferred projectile ion species; namely hydrogen$^{-1}$, deuterium, diatomic hydrogen$^{-1}$, tritium, helium$^{-3}$, and helium $^{-4}$.

Mixtures of ionic species are also employed to advantage in special applications. A mixture of monatomic and diatomic hydrogen $^{-1}$ which has not been mass analyzed, for example, will induce lattice vacancies in the host crystal at two distinct but related depths. The diatomic hydrogen will break up upon initial impact and the two resulting monatomic hydrogen projectiles will each carry half of the original energy. Thus where simultaneous proton enhanced diffusion at two distinct depths is required, a blend of hydrogen and/or helium isotopes will afford a single step bombardment process for accomplishing same.

The operating temperature of the wafer is quite critical because a temperature which is less than about 650° centigrade will reduce the impurity diffusivity to impractically low magnitudes. The rate of interstitial diffusion of the implanted hydrogen out of the crystal is also reduced. A temperature exceeding about 950° centigrade will cause the existing device structures in the wafer to rediffuse, destroying definition, location, and the precision in base widths. Thus, the preferred operating range for the wafer temperature is from 650° centigrade to 950° centigrade and the preferred narrow range for the wafer temperature is 750° to 850° centigrade.

Predeposited regions in the wafer need not be limited to deposition by high temperature diffusion. The subcollector 8, base region 22, emitter 26, and other predeposited impurity structures shown in FIG. 4f can be ion implanted by conventional techniques without departing from the scope of our invention.

The use of well focused ion beams comprises an alternate method of performing proton enhanced diffusion. A beam of hydrogen or helium ions focused to a diameter of 5 microns or less is directed to any position on the substrate at which enhanced diffusion is desired. No masks are required to protect the unexposed portions of the wafer. The combination of well focused heavy ion beams to deposit the dopant, with the instant invention of using well focused hydrogen or helium ion beams to redistribute the dopant, is a method for manufacturing semiconductor devices and circuits requiring no masks whatsoever.

The depths and thickness referred to in the foregoing description of the preferred embodiment may also be varied within the scope of the invention. In fact shallower structures with thinner epitaxial layers can be made with great advantages in performance. Such structures are permitted by the great accuracy of penetration depths attained with monoenergetic ion beams. Furthermore, shallower structures require lower energy ions which can be obtained from simpler and less expensive ion machines.

The proton enhanced diffusion process has several operating characteristics which constitute advantages over conventional ion implantation techniques and which have not been previously discussed herein. A principal advantage is that much lower acceleration energies are required to enhance impurity atom redistribution at a given depth by the proton enhanced diffusion process than to implant the impurity atoms at that depth by conventional ion implantation techniques. For example, to penetrate 2 microns in silicon requires 325 kev. of energy for a hydrogen ion in proton enhanced diffusion, but requires 1500 kev. for a boron atom and 2000 kev. for a phosphorous atom in conventional ion implantation. Thus the particle acceleration required for an application of this description must be capable of producing accelerating voltages of up to 2 million volts for conventional ion implantation as compared to the proton enhanced diffusion process which requires only 325 thousand volts. The capital investment in acceleration equipment, radiation shielding and servicing apparatus, not to mention the expense of floorspace, increases very rapidly in relation to the maximum accelerating voltage required. The proton enhanced diffusion process is thus a much more economical technique for semiconductor device fabrication than are conventional ion implantation techniques, as applied to comparable devices. In addition, hydrogen or helium gas being the precursor to the particle beam is a more readily ionized and a cleaner source gas than are the precursors to boron and phosphorus implantations in conventional ion implantation techniques. Thus more reliable and simpler source gas ionizing devices may be employed in the proton enhanced diffusion process, than may be employed in conventional ion implantation techniques.

A view of the pedestal transistor made by the method of proton enhanced diffusion is shown in FIG. 4f. The transistor is characterized by a reach-through and collector pedestal which are proton enhanced diffusions of impurities from the subcollector 14. The base-collector junction is accurately positioned due to the independence of the value of $R_p$ on the epitaxial layer thickness and the short vacancy diffusion length. Conventionally diffused pedestal transistors have a variable base width because the impurity profiles are not sufficiently steep and the length of time required to diffuse the pedestal varies in proportion to the epitaxial thickness, the uniformity of which is inherently difficult to maintain. In proton enhanced diffusion, the narrow actual distribtuion of vacancies ($\sigma_v = 1400$ A.) permits an abrupt impurity profile to be positioned at a level fixed with respect to the surface of the wafer. The resulting pedestal transistor has a uniform and reproducible base width insuring uniform high frequency characteristics for a plurality of such devices located on a monolithic chip.

It may be recalled that conventional ion implantation techniques impart a significant level of residual damage to the crystal. The negligible residue of radiation damage in the collector pedestal which results from the proton enhanced diffusion process, insures a higher carrier mobility and a longer minority carrier lifetime, thus increasing the switching speed and current carrying capacity of the device.

The proton enhanced pedestal transistor has advantages over a device made by the process disclosed in the above referenced copending application Ser. No. 875,013 both in performance and manufacturing cost. Performance advantages are 20% higher gain-band-width product, $f_T$ and a tighter distribution of $f_T$ values. Improvement of 2:1 in tightness of the current gain, $\beta$ distribution. Improvement of 5 mv. in tightness of $V_{BE}$ distribution. ($V_{BE}$ is the base to emitter voltage for a given value of collector current.) Reduction of 15% in base to collector capacitance. The improvement in circuit performance in a computer environment is 20%.

The simpler processing and higher production yield make a 30% reduction in manufacturing cost over the process disclosed in the above referenced copending application.

The foregoing has been a description of our preferred method for fabricating pedestal transistors by the proton enhanced diffusion process. We have developed an alternative method for fabricating these devices which includes the feature of inducing a plurality of pedestals to grow to different heights, simultaneously. This method is applied to pedestal transistor fabrication to make the collector reach-through connect with the reach-through segment when the collector pedestal contacts the base. So as to accommodate the growth of both a collector pedestal and a collector reach-through region in a single bombardment step and yet to assure a low resistance contact between reach-through segment 28 and reach-through 34, an attenuator 30 can be placed in the window above the collector reach-through segment 28, shown in FIG. 6. The attenuating material which is used is a 1500 A. layer of molybdenum which has a stopping power for protons sufficient to impart a difference in the value of $R_p$ equal to the difference between the length of the collector pedestal 36 and a subcollector reach-through which will contact segment 28. The molybdenum layer 30 may also make an ohmic contact with the reach-through segment 28, and thus serve as a contact. The attenuating layer 30 thus remains in place after the proton enhanced diffusion step and serves as the contact region for the subcollector reach-through. Thus, when the initial acceleration voltage for the bombarding projectile ions is set at a value such that $R_p$ is at least equal to the distance from the top of the attenuator 30 to the top of the out diffused region 14 of the sub-collector in FIG. 6, then, as the acceleration voltage is reduced in magnitude, the height of the column of impurities growing beneath the reach-through segment 28 will be greater than the height of the column of impurities growing beneath the emitter region 26, by an amount which is approximately equal to the equivalent stopping thickness of silicon for the attenuator 30. Thus, in a single bombardement step, the collector reach-through 34 will make a low resistance contact with the reach-through segment 28, minimizing the collector load resistance for the resulting pedestal transistor.

Figure 7A:
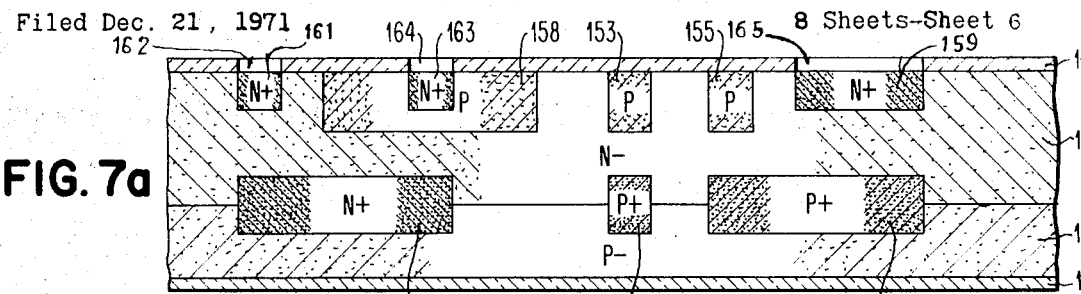
FIGS. 7a–e illustrate the sequence of steps comprising the method for making multilayer, monolithic circuits comprising pedestal transistors and diffusion capacitors, by the proton enhanced diffusion process.
Figure 7B:
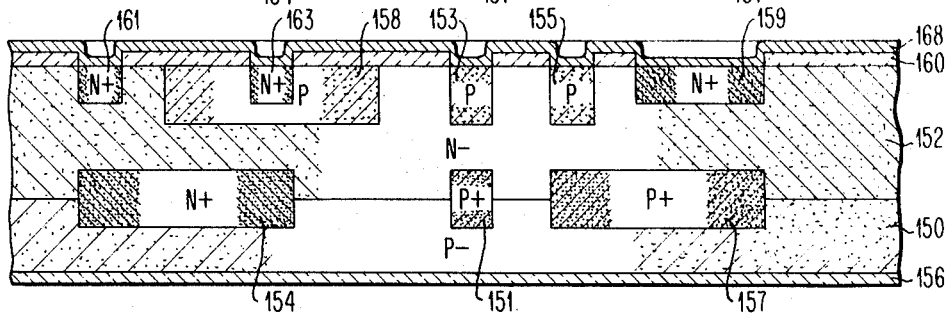
Figure 7C:
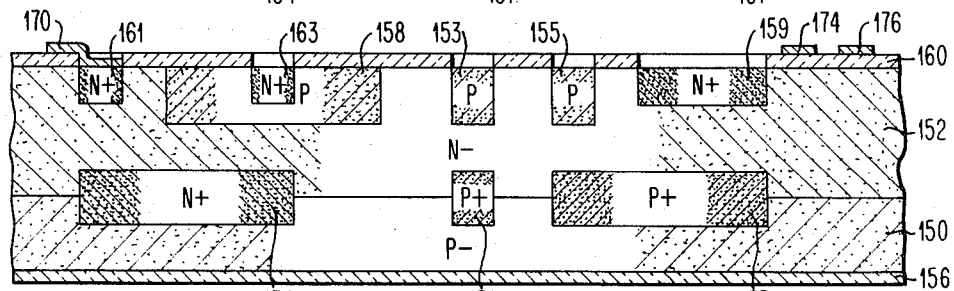
Figure 7D:
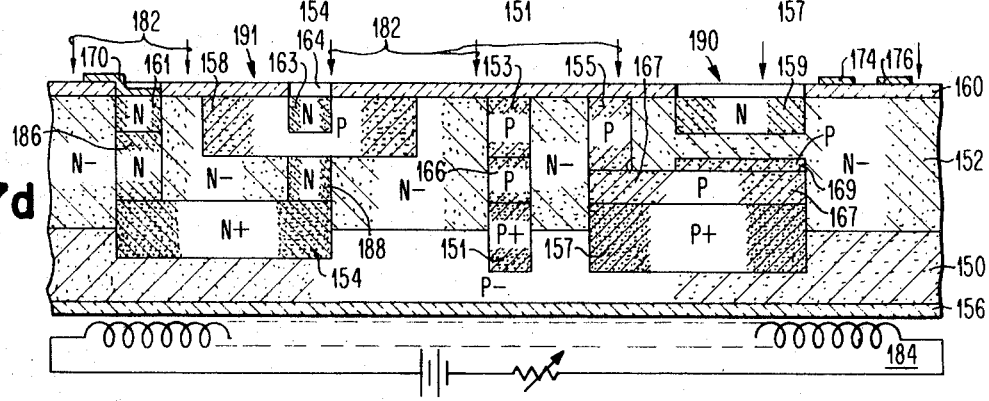
Figure 7E:
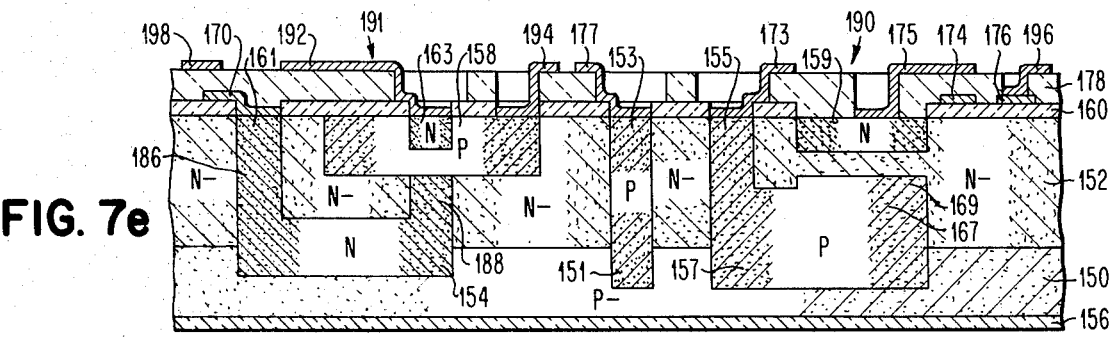

The process of proton enhanced diffusion employing a projectile ion attenuator, can be advantageously employed in the fabrication of pedestal transistors and diffusion capacitors in multilayer monolithic circuits. The sequence of steps commences with FIG. 7a where the initial structural configuration of wafer 150 has an N+ subcollector region 154, a P+ subisolation region 151, and a P+ capacitor subelectrode 157 beneath the epitaxial layer 152. Surface of epitaxial layer 152 has a base region 158 diffused in a position above the subcollector 154, an isolation segment 153 above region 151, and a capacitor subelectrode reach-through segment 155 above subelectrode 157, as shown in FIG. 7a. A thermal oxide mask 160 of 1.5 microns thickness, is grown on the surface of the epitaxial layer 152. The 1.5 microns of silicon dioxide in the mask 160 will serve as an impenetrable barrier to 325 rev. protons in the proton enhanced diffusion step. A reach-through opening 162, an emitter opening 164, and a capacitor electrode opening 165, are made in mask 160 by conventional photolithographic techniques. An N+ emitter region 163, and N+ reach-through segment 161, and an N+ capacitor electrode 159 are diffused in the epitaxial layer 152 by employing a suitable material such as arsenic having a $C_0$ concentration of $10^{21}$ per cc. During the emitter diffusion step the subisolation region 151 and the capacitor subelectrode 157 outdiffuse due to the relatively high diffusivity of the boron impurity. The outdiffused subisolation region 166 makes contact with the isolation segment 153 and the outdiffused capacitor subelectrode 167 makes contact with the subelectrode reach-through segment 155. Additional openings are made through the oxide mask 160 to permit electrical contact with other structures on the epitaxial surface. There then follows a deposition of a first layer of metal 168 over the entire surface of the oxide mask 160. The metal 168 is selectively etched by conventional photolithographic techniques so as to leave a reach-through metallization 170, other epitaxial layer contacts, and a first level metallization network of signal lines such as 174 and 176 in FIG. 7c. The reach-through metallization 170 can serve the triple purposes of forming an ohmic contact with the reach-through segment 161, forming a part of a signal line in the first level metallized signal network, and serving as a projectile ion attenuator. As previously described in FIG. 6, a layer of molybdenum 1500 A. thick will impart a differential height in the reach-through as compared to the collector pedestal, of 1500 A. for hydrogen ion bombardment. Since molybdenum also serves as a good electrical contact material, the metallic layer 168 can be molybdenum deposited to a thickness of 1500 A. The composite structure of FIG. 7d is then placed in the irradiation chamber of an accelerator and is heated to a temperature of between 750° and 850° centigrade by means of wafer heater 184. After the temperature across the wafer is stabilized, the beam current of the accelerator is turned on and the acceleration voltage set at the value of about 325 kev. At this acceleration potential, the projected range $R_p$ of the 325 kev. proton beam 182 is at 2.0 microns below the surface upon which the beam is incident, and thus causes the reach-through region 186 and collector pedestal 188 to diffuse from the subcollector region 154, and capacitor subelectrode 169 to diffuse up from subelectrode 157 as described for the process step shown at FIG. 7d. The boron impurity of the outdiffused capacitor subelectrode 167 has a higher diffusivity than the arsenic impurity of the subcollector 154 and thus the capacitor subelectrode 169 will diffuse up closer to the wafer surface than will the collector pedestal 188. After the collector pedestal 188 has grown to a sufficient height so as to form a PN junction with the base region 158 at 0.6 micron level, subcollector reach-through 186 will have contacted reach-through segment 161, and capacitor electrode 169 will have come to within 500 A. of electrode 159 forming the bypass capacitor 190. At this point, the proton beam is turned off and the wafer cooled to room temperature. Next, insulating layer of pyrolytic glass 178 is deposited to a thickness of approximately 1 micron on the surface of mask 160 and on first level metallizations 174 and 176 of FIG. 7d. Perforations are then formed at all locations where via holes are to connect the first level metallizations with the second level metallizations and at all points where second level metallizations are to contact devices on epitaxial layer 152. The openings in insulating layer 178 are made by conventional photolithographic techniques and where perforations appear over emitter segments 163, those perforations in insulating layer 178 can be larger than the corresponding perforations in the bombardment mask 160, so as to preserve the auto-alignment advantage for the contact. Then a second metallization layer 192, 194, 196, 198, and 175 is deposited on the external surface of the insulating layer 178 can be larger than the corresponding perforanum deposited to a thickness of 2000 A., is selectively etched by conventional photolithographic techniques so as to form via hole interconnections such as 194 which is the base region terminal and 196 which is a signal line via, emitter contacts 192, isolation contact 177, capacitor subelectrode contact 173 and electrode contact 175. The composite structure shown in FIG. 7e constitutes a multilayer monolithic circuit composed of pedestal transistors, bypass capacitors, and other devices interconnected by means of the bilevel network of molybdenum first level metallizations and aluminum second level metallizations. The capacitor 190 formed by electrodes 159 and 169 has a capacitance of approximately 1 picofarad.

It is to be noted that the single, continuous metallization 170 serves as an ohmic contact to the collector reach-through, a via hole interconnection between the epitaxial layer 152 and the first level metallization layer, a signal line, and a proton attenuator for inducing a different diffused column height during the process of proton enhanced diffusion of the reach-through 186.

It is to be noted that the lateral location of the collector pedestal 188, the emitter 163, and the emitter contact 192, are each defined by the emitter opening 164 in the oxide bombardment mask 160. The auto-alignment of the structures by means of the single mask 160 assures that the resulting transistor structure will have maximum current efficiency. It is to be further noted that the location of the base collector junction at the top of the collector pedestal 188 is referenced with respect to the external surface of the epitaxial layer 152, as an inherent result of the proton enhanced diffusion process. Thus, the base widths of the resulting transistors do not depend upon the precision of the thickness of the epitaxial layer 152. Furthermore, prior deposited impurity structures such as the base region 158 and the emitter region 163 are not affected by the process of proton enhanced diffusion because of the low temperatures at which the process takes place. Only the impurities in the subcollector region 154 near the collector pedestal are affected. Finally, it is to be noted that there are fewer fabrication steps in the construction of the multilayer monolithic circuit shown in FIG. 7e since base 158 and segments 153 and 155 are deposited in the same step, only one epitaxial layer is required, the emitter openings 164 serve to locate the collector pedestal, the emitter, and the emitter contact, and the collector pedestal can be optionally grown after the above positioned base and emitter regions have been deposited.

In addition to the pedestal transistor and diffusion capacitor, subsurface diffused electrical interconnections can be fabricated in multilayer monolithic circuits by the proton enhanced diffusion process. The electrical connections between devices or circuits on a monolithic chip can be made within the bulk of the semiconductor, well beneath the devices. These connections consist of heavily doped paths of conductivity types opposite to that of the substrate. While preparation of these connections is made before the devices and circuits are fabricated, the actual interconnections are made after completion of all other diffusions and epitaxial growth. In this way, the actual circuit personality of a chip can be decided upon in the final stages of processing.

Figure 8A:
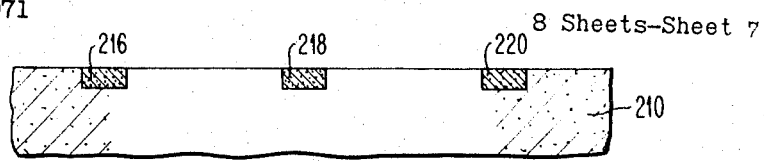
FIGS. 8a–g illustrates the sequence of steps comprising the method for making subsurface diffused interconnections by the proton enhanced diffusion process.
Figure 8B:
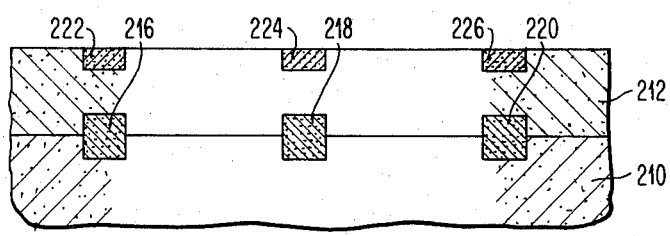
Figure 8C:
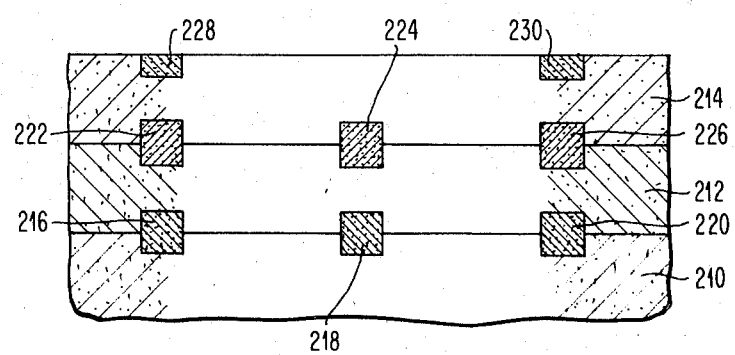
Figure 8D:
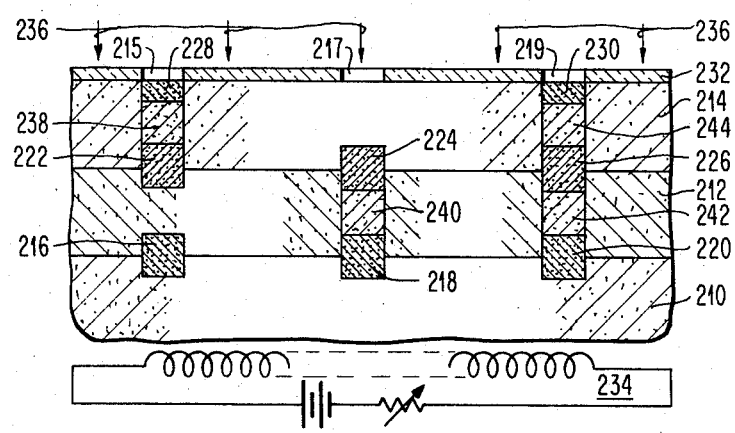

Construction of the interconnections requires that either one or more additional epitaxial layers be laid down with impurity blocks therein on or alternately a high energy ion implantation of impurity blocks be made into the wafer substrate. Our technique consists of burying within the semiconductor bulk, a matrix of heavily doped regions which can be connected to each other at a later stage by proton enhanced diffusion. The sequence of steps necessary to construct the subsurface electrical interconnection network in a monolithic chip is shown in FIGS. 8a through 8e. FIG. 8a illustrates impurity blocks 216, 218 and 220 which had been diffused into the P-type wafer substrate 210 to a $C_0$ concentration of $10^{21}$ atoms of arsenic per cc. FIG. 8b illustrates the growth of the P— epitaxial layer 212 onto the surface of wafer substrate 210. It is noted that impurity blocks 216, 218 and 220 have outdiffused into the epitaxial layers 212 during the epitaxial deposition process. Impurity blocks 222, 224 and 226 are then diffused into the surface of epitaxial layer 212 in a manner similar to that for impurity blocks 216, 218 and 220. FIG. 8c of a second P— epitaxial layer 214 onto the surface of epitaxial layer 212. Note again that impurity blocks 222, 224 and 226 have outdiffused into the epitaxial layer 214 during the growth of the epitaxial region. Impurity blocks 228 and 230, similar to impurity blocks 222, etc., are diffused into the surface of the epitaxial layer 214. Impurity blocks 228 and 230 can represent for instance diffused signal lines on the surface of the monolithic chip or elements of a transistor or other device. FIGS. 8a through 8e are elevational views of the monolithic subsurface interconnection network. The impurity block structures need not be necessarily in the same plane when view from the top of the wafer.

Figure 8E:
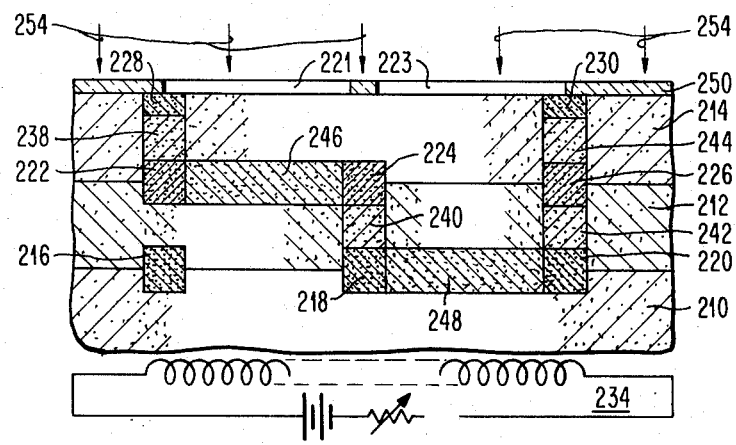

A two micron thick molybdenum mask 232 is deposited on the surface of epitaxial layer 214 and windows 217 and 219 are opened over impurity blocks 218 and 220 respectively. The wafer is then placed in the radiation chamber of a charged particle accelerator and brought up to a temperature of between 750° and 850° centigrade. After the temperature has stabilized a beam of hydrogen or helium ions are rendered incident on the wafer. For example a proton beam is accelerated to a kinetic energy of 325 kev. and made incident upon the surface of the wafer. At a kinetic energy of approximately 325 kev., the protons penetrating windows 217 and 219 will come to rest in impurity blocks 218 and 220, generating lattice vacancies which diffused in the region of these blocks and enhance the diffusivity of the arsenic impurities deposited therein. Over a period of about one hour, the kinetic energy of the bombarding protons is linearly reduced to a value of approximately 100 kev., during which time diffusion columns 240 and 242 grow from blocks 218 and 220 respectively and interconnect with impurity blocks 224 and 226 respectively. At a kinetic energy 100 kev., the protons entering through windows 217 and 219 will have lodged within impurity blocks 224 and 226 respectively. At this time the proton beam is turned off and the wafer cooled to room temperature. The wafer is removed from the accelerator and the molybdenum mask 232 is reprocessed, closing off window 217 and opening window 215 which over impurity block 222. The wafer is then replaced in the accelerator, brought up to a temperature of between 750° and 850° centigrade, and the proton beam rendered incident upon the wafer at a kinetic energy of approximately 100 kev. At 100 kev., protons entering through windows 215 and 219 lodge within impurity blocks 222 and 226 respectively. The lattice vacancies induced within impurity blocks 222 and 226 diffused in the region of the blocks and enhance the diffusivity of the arsenic impurities deposited therein. Over a period of about one hour, the kinetic energy of the proton beam is reduced from 100 kev. to 25 kev., during which time the diffusion columns 244 and 248 grow from impurity blocks 222 and 226 respectively and interconnect with impurity blocks 228 and 230 respectively. At a kinetic energy of 25 kev., the protons entering through window 215 and 219 lodge within impurity blocks 228 and 230 and at this point the proton beam is turned off and the wafer brought to room temperature. The wafer, after having been removed from the accelerator, is stripped of its molybdenum mask 232, and a new mask 250 is applied with the window 223 therein as shown in FIG. 8e. The vertical projection of window 223 intersects a portion of impurity block 218 and impurity block 220 and encompasses the region wherein the desired electrical interconnection between blocks 218 and 220 is desired. The wafer is returned to the accelerator and brought up to a temperature of between 750° and 850° centigrade at which time proton beam having a kinetic energy of about 325 kev. is rendered incident upon the wafer. The kinetic energy of the proton beam is maintained at approximately 325 kev. for a period of one half hour during which time the diffusivity of the arsenic atoms in impurity blocks 218 and 220 is enhanced and these impurity atoms diffuse between impurity blocks 218 and 220 forming the interconnection column 248. After about one half hour of bombardment, the beam is turned off, the wafer returned to room temperature and removed from the accelerator and the mask 250 is reprocessed. Window 223 is closed and window 221 is opened therein. Window 221 is located such that the vertical projection intersects a portion of impurity block 222 and impurity block 224 and fully encompasses the region where the electrical connection between block 222 and 224 is desired. The wafer is returned to the accelerator, brought up to a temperature of between 750° and 850° centigrade and a proton beam having a kinetic energy of approximately 100 kev. is rendered incident thereon. The proton beam entering through window 221 lodges in the region within and between impurity blocks 222 and 224. The diffusivity of the arsenic impurity in impurity blocks 222 and 224 is enhanced within those blocks and in the region between those blocks such that over a period of about one half hour bombardment at the constant kinetic energy of about 100 kev., the diffusion column 246 is grown and electrically interconnects impurity block 222 to impurity block 224. The proton beam is turned off after one half hour and the wafer is reduced to room temperature, removed from the accelerator, and mask 250 is removed. There results a subsurface interconnection network between impurity block 228 and impurity block 230 by means of the proton enhanced diffusion columns 238, 246, 248, 242, 244 and 240 interconnecting with impurity blocks 228, 222, 224, 218, 220, 226 and 230 as shown in FIG. 8e. The subsurface interconnection network made by proton enhanced diffusion has the improved properties of a low bulk resistivity due to the negligible amount of radiation damage imparted to the crystal from the process of proton enhanced diffusion and a noninterference with the definition of existing structures because of the relatively low temperature at which the proton enhanced diffusion process is conducted.

Figure 8F:
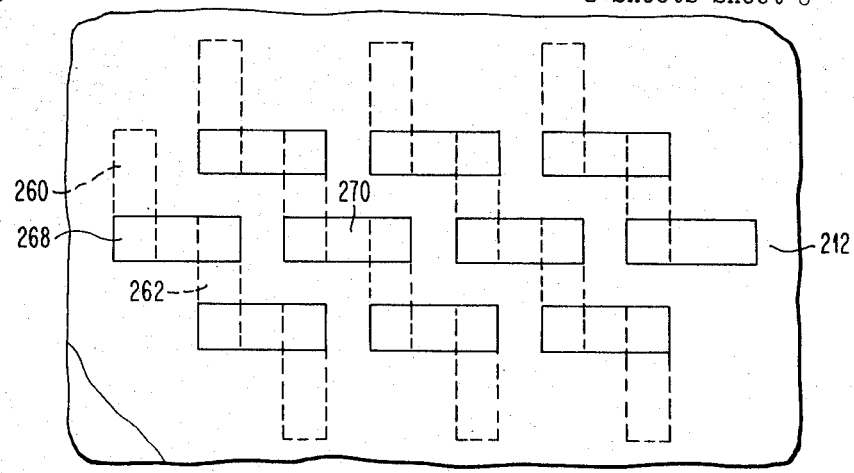
Figure 8G:
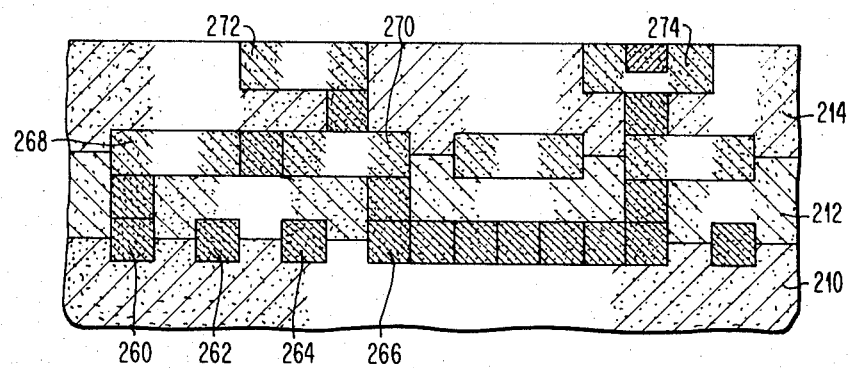

FIGS. 8f and 8g show a plan view and an elevation respectively of a three dimensional subsurface interconnection network for a monolithic chip which is made by the proton enhanced diffusion process illustrated in FIGS. 8a and 8e. The diffusion blocks 260, 262, 264 and 266 are parallelepipeds oriented perpendicular to the plane of elevation view of FIG. 8g. Impurity blocks 268 and 270 are oriented perpendicular to the blocks 260, 262, etc. It can be seen that subsurface interconnections can be readily made between device 272 and pedestal transistor 274, after completion of all other diffusions and epitaxial growths. In this way the actual circuit personality of a monolithic chip can be decided upon in the final stages of the processing thereof. Subsurface electrical interconnections for a monolithic circuit fabricated by proton enhanced diffusion techniques have the advantages of low resistivity connections due to high doping and no electromigration since the silicon being a nearly perfect crystal is less subject to the dislodgment of silicon atoms from the lattice sites due to high electron current densities. The method provides for an additional level of interconnections without multilayer metalization, and can in fact give many levels of interconnections itself. Perhaps most advantageously, the personality of the interconnection network may be determined after devices are made, which would be ideal for master slice techniques.

An alternate embodiment of this method utilizes a well focused hydrogen or helium ion beam to enhance the diffusion in selected volumes within the substrate. Thus, no masking is required, and any two impurity blocks can be interconnected by merely directing the beam laterally to the proper area and adjusting the beam energy to cause enhanced diffusion of the proper depth.

Figure 9A:
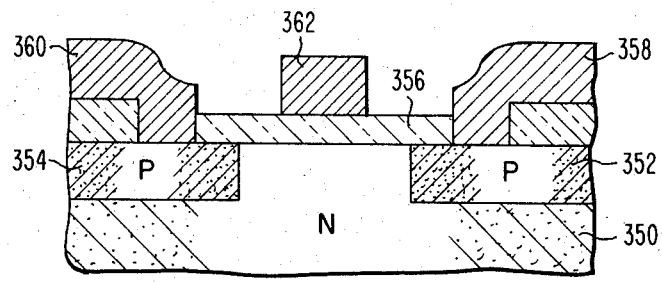
FIGS. 9a–b illustrates the method for fabricating a IGFET device by the proton enhanced diffusion process.
Figure 9B:
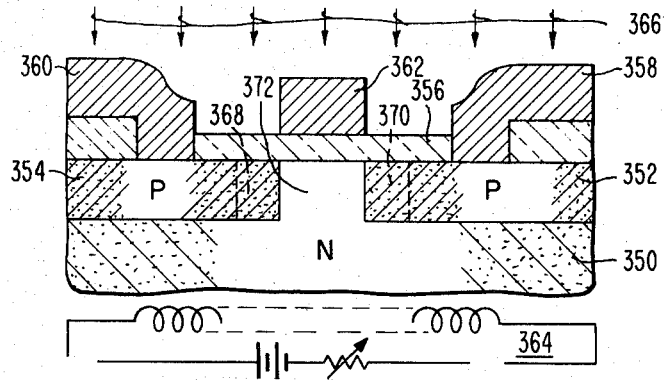

In addition to bipolar transistors, the proton enhanced diffusion process is employed in the fabrication of unipolar field effect transistors. FIG. 9a shows a partially completed IGFET device formed on N-type wafer substrate 350. Precursor source 354 and precursor drain 352 are P type diffusions of boron having a $C_0$ concentration of $10^{21}$/cc. After the 0.1 micron thick insulating oxide layer 356 and the source and drain contacts 360 and 358 are deposited, the gate electrode 362 is applied to the oxide 356. The gate 362 is composed of molybdenum and is 2 microns thick. The gate 362 will stop protons having energies less than 325 kev. from penetrating into the channel region 372 beneath the gate. The wafer is placed in a proton accelerator and heated to between 750° and 850° centigrade. A beam of hydrogen or helium ions is then made incident upon the wafer. For example, an approximately 50 kev. beam of protons is rendered incident thereon, penetrating the oxide layer 356 betwen the gate 362 and the source and drain contacts 360 and 358. The protons penetrate wafer 350 to a depth of 0.5 microns and produce lattice vacancies within the source and drain regions 354 and 352 and in the regions 368 and 370 around the gate 362. The enhanced diffusivity of the boron impurity of the boron from these regions and into regions 368 and 370 to complete the source and drain of the device and leave a well-defined, self-aligned channel region 372 therebetween. The resulting IGFET device shown in FIG. 9b has a low residual bulk resistivity in the source and drain regions.

While the invention has been particularly shown and described with reference to the preferred embodiments thereof, it will be understood by those skilled in the art that the foregoing and other changes in form and detail may be made therein without departing from the spirit and scope of the invention.

What is claimed is:

1. In a process for fabricating a device in a semiconductor wafer of a first conductivity type, having at least one region of a second conductivity type, the improvement comprising the steps of:
   bombarding the wafer with ions having an atomic mass of not greater than 4 a.m.u. accelerated to a first kinetic energy while maintaining the wafer at an elevated temperature, to induce lattice vacancies at a first locus within said region,
   controllably changing the kinetic energy of ions bombarding the wafer so as to induce lattice vacancies at a second locus displaced from the first locus,
   whereby the rate and degree of diffusion of the impurity atoms of said second conductivity type is controllably enhanced and directed toward said second locus.

2. In the process for fabricating a device of claim 1 wherein the controlled change in the kinetic energy of the ions is a reduction, so as to displace the locus of generation of lattice vacancies toward the external surface of the wafer,
   whereby the rate and degree of diffusion of the impurity atoms of said second conductivity type is controllably enhanced and directed toward the external surface of said wafer.

3. In the process for fabricating a device of claim 1, wherein the controlled change in the kinetic energy of the ions is an increase, so as to displace the locus of generation of lattice vacancies to a point deeper within the wafer,
   whereby the rate and degree of diffusion of the impurity atoms of said second conductivity type is controllably enhanced and directed away from the external surface of said wafer.

4. In a process for fabricating a pedestal transistor, having a highly doped subcollector region of a first conductivity type beneath the surface of a semiconductor of a second conductivity type, said semiconductor having a base region diffusion of the second conductivity type located at the external surface thereof and above said subcollector region, wherein the improvement comprises the step of:
   bombarding the semiconductor with an accelerated beam of ions having an atomic mass of not greater than 4 a.m.u. while maintaining the semiconductor at an elevated temperature, said beam of ions having a kinetic energy sufficient to induce lattice vacancies within said subcollector region, whereby a collector pedestal is selectively grown from the subcollector so as to form a collector-pedestal transistor device.

5. In a process for fabricating a pedestal transistor, having a highly doped subcollector region of a first conductivity type beneath the surface of a semiconductor of a second conductivity type, said semiconductor having a base region diffusion of the second conductivity type located at the external surface thereof and above said subcollector region, wherein the improvement comprises the steps of:

focusing a beam of ions having an atomic mass of not greater than 4 a.m.u., bombarding said base region with said focused beam of ions while maintaining the semiconductor at an elevated temperature, said beam of ions having a kinetic energy sufficient to induce lattice vacancies within said subcollector region, whereby a collector pedestal is selectively grown from the subcollector so as to form a collector pedestal transistor device.

6. In a process for fabricating a pedestal transistor, having a highly doped subcollector region of a first conductivity type beneath the surface of a semiconductor of a second conductivity type, said semiconductor having a base region diffusion of the second conductivity type located at the external surface thereof and above said subcollector region, wherein the improvement comprises the steps of:

positioning a mask on the external surface of said semiconductor with a perforation over said base region, bombarding the semiconductor with an accelerated beam of ions having an atomic mass of not greater than 4 a.m.u., while maintaining the semiconductor at an elevated temperature, said beam of ions having a kinetic energy sufficient to induce lattice vacancies within said subcollector region, whereby a collector pedestal is selectively grown from the subcollector so as to form a collector-pedestal transistor device.

7. In a process for fabricating a pedestal transistor having a highly doped subcollector region of a first conductivity type beneath an epitaxial layer of a second conductivity type, said epitaxial layer having a base region diffusion of the second conductivity type located at the external surface of the epitaxial layer and above said subcollector region, said epitaxial layer having a reach-through segment diffusion region of a first conductivity type located above said subcollector region at the surface of said epitaxial layer, wherein the improvement comprises the steps of:

positioning a mask on the external surface of said epitaxial layer with a first perforation over said reach-through region and a second perforation over said base region, bombarding the epitaxial layer with an accelerated beam of ions having an atomic mass of not greater than 4 a.m.u., while maintaining the epitaxial layer at an elevated temperature, said beam of ions having a kinetic energy sufficient to induce lattice vacancies within said subcollector region, whereby a subcollector reach-through and a collector-pedestal are selectively grown from the subcollector so as to form a collector-pedestal transistor device.

8. In a process for fabricating a pedestal transistor having a highly doped subcollector region of a first conductivity type beneath an epitaxial layer of a first conductivity type, said epitaxial layer having a base region diffusion of a second conductivity type located at the external surface of the epitaxial layer and above said subcollector region, said epitaxial region having a reach-through segment diffusion region of a first conductivity type located above said subcollector region at the surface of said epitaxial layer, wherein the improvement comprises the steps of:

positioning a mask on the external surface of said epitaxial layer with a first perforation over said reach-through region and a second perforation over said base region, bombarding the epitaxial layer with an accelerated beam of ions having an atomic mass of not greater than 4 a.m.u., while maintaining the epitaxial layer at an elevated temperature, said beam of ions having a first kinetic energy sufficient to induce lattice vacancies within said subcollector, controllably reducing the kinetic energy of the beam of ions to a second kinetic energy sufficient to induce lattice vacancies in the vicinity of said base diffusion region for ions passing through said second perforation, whereby a subcollector reach-through and a collector pedestal are selectively grown from the subcollector so as to form a collector-pedestal transistor device.

9. A process for fabricating a plurality of outdiffused pedestals of varying height, from a buried impurity region of a first conductivity type in a semiconductor having a mask with at least two perforations located above said region, comprising the steps of:

bombarding the semiconductor with an accelerated beam of ions having an atomic mass of not greater than 4 a.m.u., while maintaining the semiconductor at an elevated temperature, selectively attenuating the beam at at least one of said perforations, controllably reducing the kinetic energy of the beam from a first kinetic energy sufficient to permit the attenuated portion of said beam to induce lattice vacancies within said region, to a second kinetic energy not sufficient to permit the unattenuated portion of said beam to induce lattice vacancies within said region, whereby he height of the outdiffused pedestal grown by the attenuated portion of sait beam will be greater than the height of the pedestal grown by the unattenuated portion.

10. In a process for fabricating a pedestal transistor having a highly doped subcollector region of a first conductivity type beneath an epitaxial layer of a first conductivity type, said epitaxial layer having a base region diffusion of a second conductivity type located at the external surface of the epitaxial layer and above said subcollector region, said epitaxial layer having a reach-through segment diffusion region of a first conductivity type located above said subcollector region at the surface of said epitaxial layer, wherein the improvement comprises the steps of:

positioning a mask on the external surface of said epitaxial layer with a first perforation over said reach-through region and a second perforation over said base region, bombarding the epitaxial layer with an accelerated beam of ions having an atomic mass of not greater than 4 a.m.u., while maintaining the epitaxial layer at an elevated temperature, selectively attenuating the beam passing through said first perforation, controllably reducing the kinetic energy of the beam from a first kinetic energy sufficient to permit the portion of said beam passing through said first perforation to induce lattice vacancies within said region, to a second kinetic energy not sufficient to permit the portion of said beam passing through said second perforation to induce lattice vacancies within said region, whereby a collector pedestal is grown from the subcollector to a first height to meet the base region and a collector reach-through is grown from the subcollector to a second height to meet the collector reach-through segment.

11. In a process for fabricating a pedestal transistor having a highly doped subcollector region of a first conductivity type beneath an epitaxial layer of a first conductivity type, said epitaxial layer having a base region diffusion of a second conductivity type located at the external surface of the epitaxial layer and above said subcollector region, whereby the improvement comprises the steps of:

forming a mask on the external surface of said epitaxial layer with a first perforation over said subcollector and outside the area of said base and a second perforation over said subcollector and within the area of said base, diffusing an impurity of said first conductivity type through said first and second perforations, depositing a first layer of metal within said first perforation to serve as an ohmic contact and a particle attenuator, and along selected lines on the surface of said mask, bombarding the wafer with an accelerated beam of ions having an atomic mass of not greater than 4 a.m.u., while maintaining the wafer at an elevated temperature, said beam of ions having a kinetic energy sufficient to induce lattice vacancies within said collector region, whereby a self-aligned collector pedestal and emitter and a self-aligned collector reach-through, reach-through segment, and reach-through contact are formed in a pedestal transistor device.

12. In a process for fabricating monolithic, multilayer semiconductor circuits in a wafer having a highly doped subcollector region of a first conductivity type beneath an epitaxial layer of a first conductivity type, said epitaxial layer having a base region diffusion of a second conductivity type located at the external surface of the epitaxial layer and above said subcollector region, wherein the improvement comprises the steps of:

forming a mask on the external surface of said epitaxial layer with a first perforation over said subcollector and outside the area of said base and a second perforation over said subcollector and within the area of said base, diffusing an impurity of said first conductivity type through said first and second perforations, depositing a first layer of metal within said first perforation to serve as an ohmic contact and a particle attenuator, and along selected lines on the surface of said mask, bombarding the wafer with an accelerated beam of ions having an atomic mass of not greater than 4 a.m.u., while maintaining the wafer at an elevated temperature, said beam of ions having a kinetic energy sufficient to induce lattice vacancies within said subcollector region, forming an insulating layer on the surface of said mask and said first layer of metal with a perforation superimposed on said second perforation in said mask, depositing a second layer of metal within said second perforation and along selected lines on the surface of said insulating layer, wherein a self-aligned collector pedestal, emitter, and emitter contact is fabricated for a pedestal transistor and in a monolithic, multilayer circuit.

13. In a process for fabricating a diffused electrical interconnection on a semiconductor wafer of a first conductivity type having at least two regions of a second conductivity type, the improvement comprising the steps of:

bombarding the wafer with an accelerated beam of ions having an atomic mass of not greater than 4 a.m.u., while maintaining the wafer at an elevated temperature, said beam of ions having a kinetic energy sufficient to induce lattice vacancies within and between said regions, whereby the rate and degree of diffusion of the impurity atoms of said second conductivity type is controllably enhanced between said regions, thus forming a continuous diffusion segment electrically connecting said regions.

14. In a process for fabricating a diffused electrical interconnection on a semiconductor wafer of a first conductivity type having at least two regions of a second conductivity type, the improvement comprising the steps of:

focusing a beam of ions having an atomic mass of not greater than 4 a.m.u., bombarding said regions with said focused beam of ions while maintaining the wafer at an elevated temperature, said beam of ions having a kinetic energy sufficient to induce lattice vacancies within and between said regions, whereby the rate and degree of diffusion of the impurity atoms of said second conductivity type is controllably enhanced between said regions, thus forming a continuous diffusion segment electrically connecting said regions.

15. In a process for fabricating a diffused electrical interconnection on a semiconductor wafer of a first conductivity type having at least two regions of a second conductivity type, the improvement comprising the steps of:

forming a mask on the external surface of said wafer having a perforation, the vertical projection of which will encompass at least two of said regions, bombarding said regions with said focused beam of having an atomic mass of not greater than 4 a.m.u., while maintaining the wafer at an elevated temperature, said beam of ions having a kinetic energy sufficient to induce lattice vacancies within and between said regions, whereby the rate and degree of diffusion of the impurity atoms of said second conductivity type is controllably enhanced between said regions, thus forming a continuous diffusion segment electrically connecting said regions.

16. In a process for fabricating an IGFET device on a semiconducting wafer of a first conductivity type having a source diffusion segment and a drain diffusion segment of a second conductivity type, said wafer having an insulating layer supporting a gate electrode located between said segments, wherein the improvement comprises the step of:

bombarding the wafer with an accelerated beam of ions having an atomic mass of not greater than 4 a.m.u., while maintaining the wafer at an elevated temperature, said beam of particles having a kinetic energy sufficient to induce lattice vacancies within and between said segments and said gate, whereby the rate and degree of diffusion of the impurity atoms in said segments is enhanced and the source and drain regions are thereby induced to grow out and to become self-aligned with the gate.

17. A process for fabricating a diffusion capacitor having a subelectrode of a first conductivity type imbedded in the surface of a semiconducting wafer of said first conductivity type having an epitaxial layer of a second conductivity type formed over said substrate with an upper electrode region of said second conductivity type located on the upper surface of said epitaxial layer and over said subelectrode region, comprising the steps of:

forming a mask on the external surface of said epitaxial layer with a perforation over said upper electrode region;

bombarding the wafer with an accelerated beam of ions having an atomic mass of not greater than four a.m.u., while maintaining the wafer at an elevated temperature, said beam of ions having a kinetic energy sufficient to induce lattice vacancies within said subelectrode region;

whereby said subelectrode is grown by the process of proton enhanced diffusion so that its upper boundary approaches the lower boundary of said upper electrode thereby forming a diffusion capacitor.

References Cited

UNITED STATES PATENTS

| | | | |
|---|---|---|---|
| 3,312,881 | 4/1967 | Yu | 148—186 X |
| 3,431,150 | 3/1969 | Dolan, Jr. et al. | 148—1.5 |
| 3,481,776 | 12/1969 | Manchester | 117—212 |
| 3,620,851 | 11/1971 | King et al. | 148—1.5 |
| 3,655,457 | 4/1972 | Duffy et al. | 148—1.5 |

OTHER REFERENCES

Nelson et al.: Radiation-Enhanced Diffusion of Boron in Silicon, Applied Physics Letter, vol. 15, No. 8, Oct. 15, 1969, pp. 246–248.

Ziegler: Improving The Electrical Characteristics of Ion Implantation, IBM Tech. Disc. Bull., vol. 12, No. 10, March 1970, p. 1576.

Baruch et al.: Vacancy Enhanced Diffusion in Silicon, Discussions of The Faraday Society, The Faraday Soc., Aberdeen, Scot., No. 31 (1961), pp. 76–85.

L. DEWAYNE RUTLEDGE, Primary Examiner

J. M. DAVIS, Assistant Examiner

U.S. Cl. X.R.

148—175; 317—234 L, 235 AY

UNITED STATES PATENT AND TRADEMARK OFFICE
CERTIFICATE OF CORRECTION

PATENT NO. : 3,756,862
DATED : September 4, 1973
INVENTOR(S) : Junghi Ahn et al.

It is certified that error appears in the above-identified patent and that said Letters Patent are hereby corrected as shown below:

Column 5, line 34, the equation "$V^{CB}$" should read --$V_{CB}$--.
Column 5, line 36, the equation "Pf" should read --$P^{f}$--.
Column 5, line 37, the equation "$V^{CB}$" should read --$V_{CB}$--.

Column 22, lines 29-34, Claim 15, "bombarding said regions with said focused beam of having an atomic mass of not greater than 4 a.m.u., while maintaining the wafer at an elevated temperature, said beam of ions having a kinetic energy sufficient to induce lattice vacancies within and between said regions," should read --bombarding the wafer with an accelerated beam of ions having an atomic mass of not greater than 4 a.m.u., while maintaining the wafer at an elevated temperature, said beam of ions having a kinetic energy sufficient to induce lattice vacancies within and between said regions,--.

Signed and Sealed this

Thirtieth Day of October 1979

[SEAL]

Attest:

RUTH C. MASON
Attesting Officer

LUTRELLE F. PARKER
Acting Commissioner of Patents and Trademarks